United States Patent
Ikeda et al.

(10) Patent No.: US 10,710,641 B2
(45) Date of Patent: Jul. 14, 2020

(54) VEHICLE PILLAR STRUCTURE

(71) Applicant: TOYOTA JIDOSHA KABUSHIKI KAISHA, Toyota-shi (JP)

(72) Inventors: Koki Ikeda, Toyota (JP); Motoya Sakabe, Nisshin (JP); Kazuki Furukawa, Miyoshi (JP)

(73) Assignee: TOYOTA JIDOSHA KABUSHIKI KAISHA, Toyota-shi (JP)

(*) Notice: Subject to any disclaimer, the term of this patent is extended or adjusted under 35 U.S.C. 154(b) by 0 days.

(21) Appl. No.: 16/139,399

(22) Filed: Sep. 24, 2018

(65) Prior Publication Data
US 2019/0126985 A1    May 2, 2019

(30) Foreign Application Priority Data
Nov. 2, 2017 (JP) ................................ 2017-212948

(51) Int. Cl.
*B62D 25/04* (2006.01)
*B60J 1/00* (2006.01)
*B62D 29/00* (2006.01)

(52) U.S. Cl.
CPC .............. *B62D 25/04* (2013.01); *B60J 1/004* (2013.01); *B62D 29/007* (2013.01)

(58) Field of Classification Search
CPC .................................................... B62D 25/04
See application file for complete search history.

(56) References Cited

U.S. PATENT DOCUMENTS

| | | | | |
|---|---|---|---|---|
| 2010/0186477 A1* | 7/2010 | Barthelemy | ........... | B21D 15/03 72/370.23 |
| 2011/0248525 A1* | 10/2011 | Lundstroem | ........... | B62D 25/04 296/191 |
| 2016/0368537 A1* | 12/2016 | Toyota | ..................... | B60J 1/004 |
| 2017/0253275 A1* | 9/2017 | Terada | ................... | B62D 29/04 |
| 2018/0273096 A1* | 9/2018 | Ikeda | ..................... | B62D 21/00 |
| 2018/0273102 A1* | 9/2018 | Komoriya | .............. | B62D 25/04 |
| 2018/0273103 A1* | 9/2018 | Komoriya | ............ | B62D 29/005 |
| 2018/0273104 A1* | 9/2018 | Ikeda | ..................... | B62D 25/04 |
| 2018/0273106 A1* | 9/2018 | Ikeda | ..................... | B62D 29/04 |
| 2019/0039553 A1* | 2/2019 | Komura | ............... | B60J 10/7775 |
| 2019/0126986 A1* | 5/2019 | Ikeda | ................... | B62D 29/005 |
| 2019/0144042 A1* | 5/2019 | Sakabe | ................. | B62D 25/04 296/203.02 |
| 2019/0152419 A1* | 5/2019 | Tanaka | .................... | B60R 21/04 |

(Continued)

FOREIGN PATENT DOCUMENTS

| | | | | |
|---|---|---|---|---|
| DE | 102014204194 A1 * | 9/2014 | ............. | B60J 1/008 |
| JP | 2013-112077 | 6/2013 | | |
| JP | 2017-7509 | 1/2017 | | |

*Primary Examiner* — Jason S Morrow
(74) *Attorney, Agent, or Firm* — Oblon, McClelland, Maier & Neustadt, L.L.P.

(57) ABSTRACT

A vehicle pillar structure includes: a pair of frame components that extends in a longitudinal direction of a vehicle pillar; and a transparent component that is formed so as to be transparent, and that bridges a gap between the pair of frame components. Each of the pair of frame components is in a cylindrical shape having no seams in a cross-section thereof, and a planar transparent component joining surface to which the transparent component is joined is included as part of an outer peripheral surface of each of the pair of frame components.

8 Claims, 3 Drawing Sheets

(56) References Cited

U.S. PATENT DOCUMENTS

| | | | |
|---|---|---|---|
| 2019/0161009 A1* | 5/2019 | Honma | B62D 25/04 |
| 2019/0217790 A1* | 7/2019 | Tanaka | B60R 13/025 |
| 2019/0217899 A1* | 7/2019 | Ikeda | B62D 25/02 |
| 2019/0217900 A1* | 7/2019 | Ikeda | B60J 1/10 |
| 2019/0225275 A1* | 7/2019 | Miura | B60J 1/06 |

* cited by examiner

VEHICLE PILLAR STRUCTURE

CROSS-REFERENCE TO RELATED APPLICATION

This application is based on and claims priority under 35 USC 119 from Japanese Patent Application No. 2017-212948 filed on Nov. 2, 2017, the disclosure of which is incorporated by reference herein in its entirety.

BACKGROUND

Technical Field

The present disclosure relates to a vehicle pillar structure.

Related Art

In a vehicle body side portion structure disclosed in Japanese Unexamined Patent Application (JP-A) No. 2013-112077, an A pillar that is formed in a window frame shape has an A pillar upper member and a sub-pillar (i.e., a pair of frame members) that have a closed cross-sectional structure and are arranged in parallel in a vehicle front-rear direction, and corner window glass bridges the gap between this pair of frame members. As a result, visibility of the driver for an outside of the vehicle is improved.

SUMMARY

However, the above-described pair of frame members each have a structure in which the closed cross-section is formed by spot welding two plate materials together via welding flanges, and then joining the corner window glass to these flanges. Because of this, the width of each frame member is made wider by size of the flanges, and the problem arises that the field of vision of a vehicle occupant is consequently made narrower.

The present disclosure was conceived in view of the above-described circumstances and, in a vehicle pillar structure in which a transparent component bridges a gap between a pair of frame components, provides a vehicle pillar structure that enables a width of the frame components to be made narrower.

A vehicle pillar structure of a first aspect of the present disclosure is provided with a pair of frame components that extend in a longitudinal direction of a vehicle pillar, and a transparent component that is formed so as to be transparent and that bridges a gap between the pair of frame components. Each of the pair of frame components is formed in a cylindrical shape having no seams in a cross-section thereof, and a planar transparent component joining surface to which the transparent component is joined is included as part of an outer peripheral surface of each of the pair of frame components.

In the vehicle pillar structure of the first aspect, a transparent component bridges a gap between a pair of frame components that extend in the longitudinal direction of a vehicle pillar. Each of the pair of frame components are formed in a cylindrical shape having no seams formed in a cross-section thereof, and the transparent component is joined to planar transparent component joining surfaces which are included as part of each frame component.

Because of this, there is no need for flanges which are used when the frame components are formed by welding two plate materials together, or for flanges to which the transparent component is joined. As a consequence, a width of each frame component can be reduced.

A vehicle pillar structure of a second aspect of the present disclosure is the above-described first aspect, and a planar shield joining surface to which a windshield is joined is included as part of an outer peripheral surface of one of the pair of frame components.

According to the vehicle pillar structure of the first aspect, a planar transparent component joining surface to which a transparent component is joined, and a planar shield joining surface to which a windshield is joined are included as part of an outer peripheral surface of one of the pair of frame components that are formed in a cylindrical shape having no seams formed in a cross-section thereof. As a consequence, because there is no need to provide a flange to which the windshield may be joined at the aforementioned one frame component, the width of the frame component to which the windshield is joined can be made narrower.

A vehicle pillar structure of a third aspect of the present disclosure is the above-described second aspect, and, as a result of a step-shaped portion being formed at the one frame component between the shield joining surface and the transparent component joining surface, the shield joining surface is set back further toward a vehicle interior side than the transparent component joining surface.

According to the vehicle pillar structure of the third aspect, a step-shaped portion is formed between a windshield and a transparent component at a frame component whose outer peripheral surface includes a transparent component joining surface to which the transparent component is joined, and a windshield joining surface to which the windshield is joined. The shield joining surface is set back further toward the vehicle interior side than the transparent component joining surface. As a consequence, for example, windshield washing liquid blown onto the windshield is able to flow upwards (i.e., towards a vehicle roof side) easily along the above-described step-shaped portion, and is impeded from flowing towards the transparent component side.

As has been described above, according to the vehicle pillar structure of the present disclosure, in a structure in which a transparent component bridges a gap between a pair of frame components, it is possible to reduce the width of the frame components.

BRIEF DESCRIPTION OF THE DRAWINGS

Exemplary embodiments of the present disclosure will be described in detail based on the following figures, wherein.

DETAILED DESCRIPTION

Hereinafter, a vehicle pillar structure 10 according to an exemplary embodiment of the present disclosure will be described using FIG. 1 and FIG. 2. Note that an arrow FR, an arrow UP, and an arrow RH (OUT) that are shown in the appropriate drawings respectively indicate a front side (i.e., a direction of forward travel) of a vehicle 12 in which the vehicle pillar structure 10 is applied, an upper side, and a right side (i.e., an outer side in a vehicle width direction). Hereinafter, if simple front-rear, left-right, or up-down directions are used in the following description, then, unless specifically stated otherwise, these refer respectively to a front-rear directions of a vehicle, a left-right directions of a vehicle (i.e., the vehicle width direction), and an up-down directions of a vehicle. Further, when an inner side and outer side are used in the following description, then, unless specifically stated otherwise, these refer to an inner side and outer side in the vehicle width direction.

(Structure)

Figure 1:
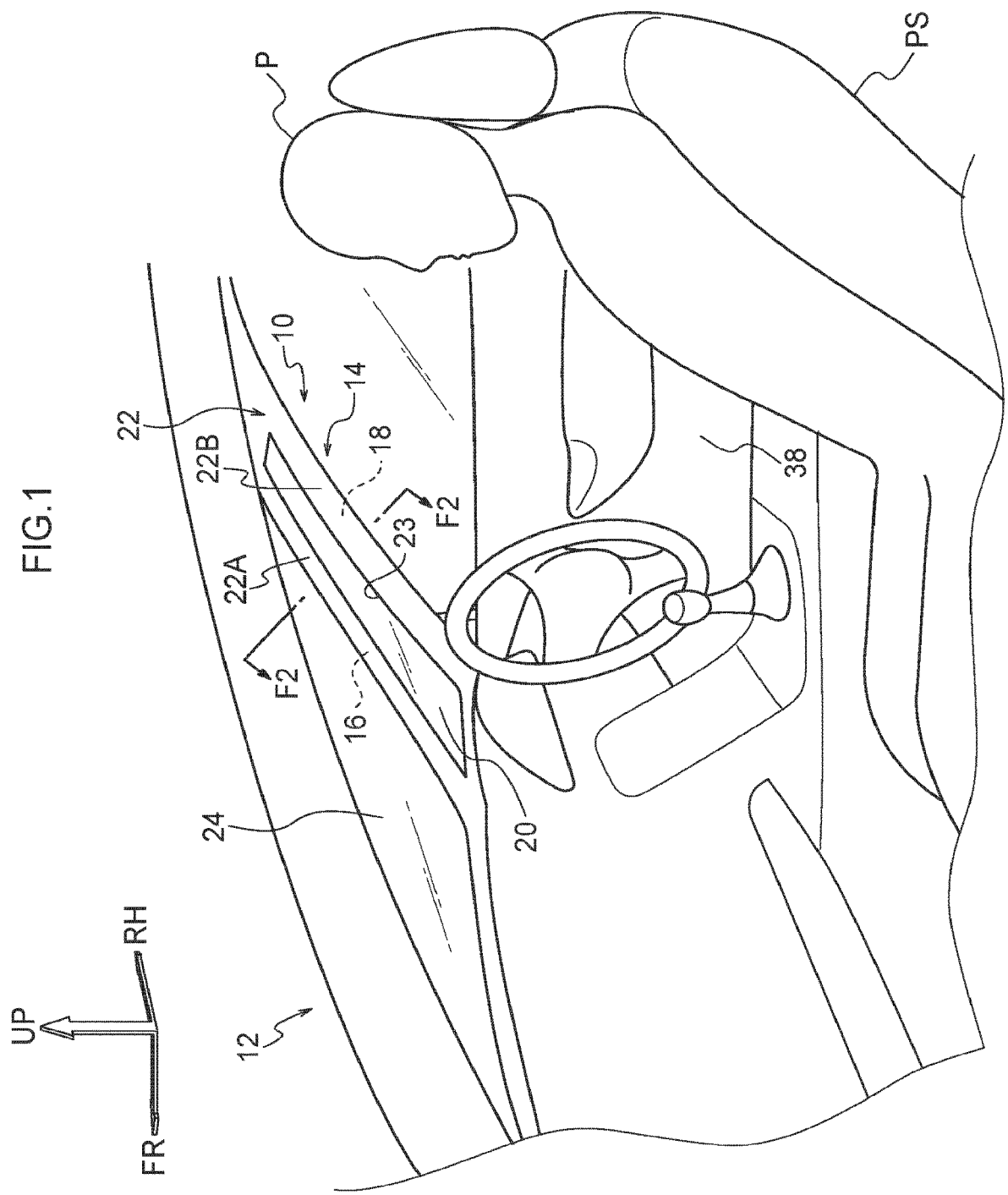
FIG. 1 is a perspective view as seen from a vehicle left side showing a front portion of a vehicle cabin of a vehicle in which a vehicle pillar structure according to a preferred embodiment of the present disclosure is applied.
Figure 2:
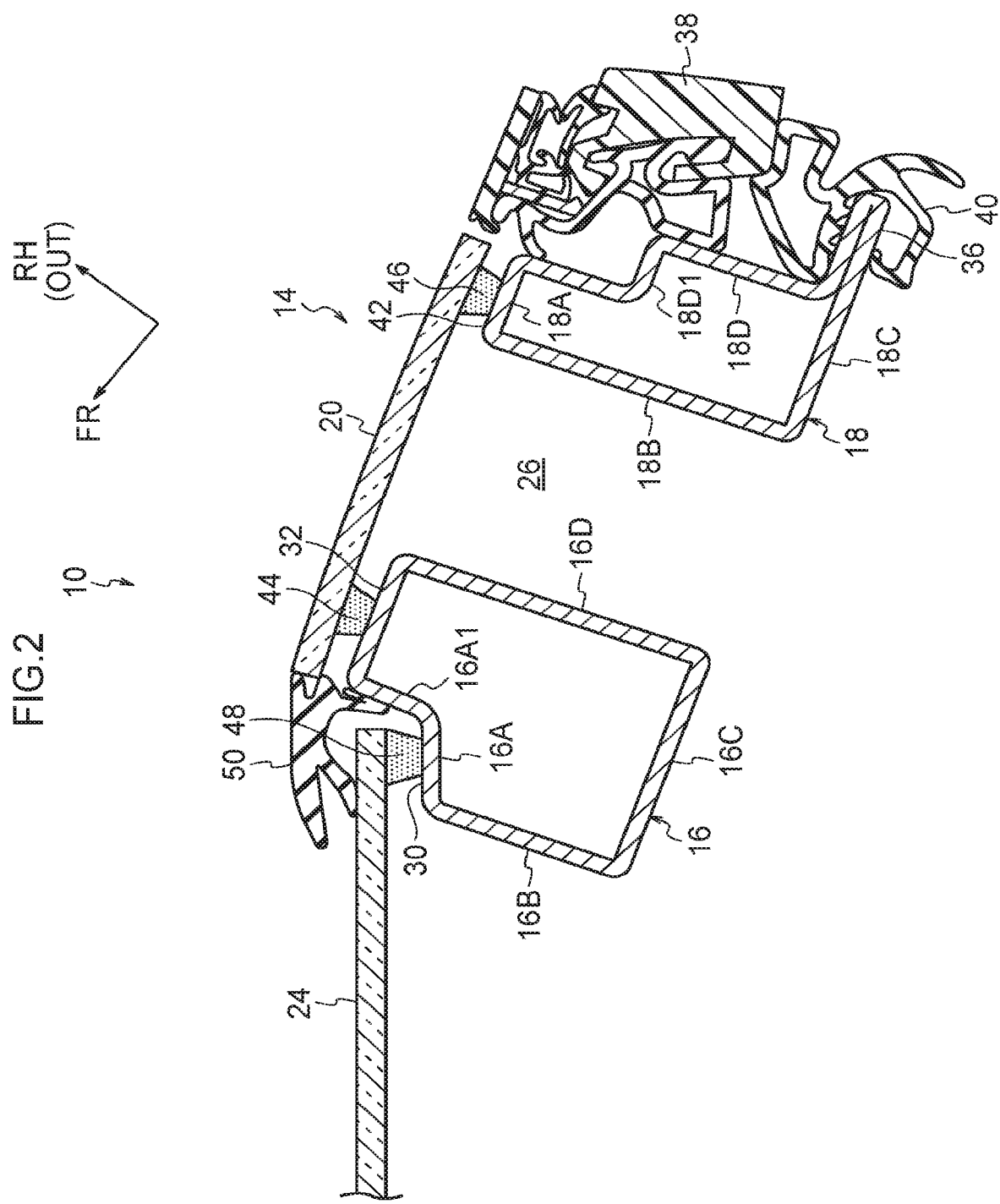
FIG. 2 is a cross-sectional view showing an enlargement of a cross-section taken along a line F2-F2 in FIG. 1.

As is shown in FIG. 1 and FIG. 2, a vehicle pillar structure 10 according to an exemplary embodiment of the present disclosure is applied to an A pillar 14, which is a pillar of the vehicle 12. Note that in FIG. 1 and FIG. 2, an A pillar 14 on the vehicle left side has been omitted from the drawings, however, the left and right A pillars 14 have the same structure as each other apart from being formed having left and right symmetry. Hereinafter, the right side A pillar 14 is referred to simply as the 'A pillar 14', and any description of the structure of the left side A pillar 14 is omitted.

The A pillar 14 is provided with a pair of frame components in the form of a first frame component 16 and a second frame component 18, pillar glass 20, which is a transparent component (i.e., a transparent plate), and a pillar garnish 22 (omitted from all drawings except FIG. 1), which is an interior garnish member. The first frame component 16 and the second frame component 18 extend in a longitudinal direction of the A pillar 14, and form a frame of the A pillar 14. The first frame component 16 and the second frame component 18 are inclined such that they approach an vehicle upper side as they approach a vehicle rear side, and bridge a gap between an A pillar lower member and a front header (not shown in the drawings) either directly or via a separate frame component. The first frame component 16 extends alongside a right end portion (i.e., an end portion at one side in the vehicle width direction) of a windshield (i.e., a front windshield) 24. The second frame component 18 is disposed at a vehicle rear side relative to the first frame component 16 so as to be at the other side of a gap 26, and extends in parallel with the first frame component 16.

The first frame component 16 and the second frame component 18 are formed by non-circular pipes formed, for example, from high tensile strength steel plate, and form non-circular shaped (i.e., substantially rectangular) closed cross-sections when viewed in longitudinal directions thereof (i.e., from the directions in which they extend). The first frame component 16 and the second frame component 18 are manufactured via a 3-Dimensional Hot Bending and Direct Quench (3DQ) process, and are formed in a cylindrical shape having no seams (i.e., weld portions) formed in a cross-section thereof. In a 3DQ process, hot bending processing and direct quenching processing are performed in a single step on a material forming the closed cross-sectional structure using robots. As a result, a desired 3-dimensional bending shape as well as increased strength from the direct quenching can both be obtained simultaneously. Hereinafter, the structures of the first frame component 16 and the second frame component 18 will be described in detail.

The first frame component 16 has an outer side wall 16A that is disposed at a vehicle exterior side, a front side wall 16B that extends from a front end portion of the outer side wall 16A towards an inner side and towards the vehicle rear side, an inner side wall 16C that extends from an end portion at the inner side of the front side wall 16B towards the vehicle rear side and towards an outer side, and a rear side wall 16D that extends from a rear end portion of the inner side wall 16C towards the outer side and towards the vehicle front side. An end portion at the outer side of the rear side wall 16D is connected to a rear end portion of the outer side wall 16A. A cross-section of the outer side wall 16A when viewed in the longitudinal direction of the first frame component 16 is bent substantially in the shape of a crank, and a step-shaped portion 16A1 is formed in a central portion of the outer side wall 16A. As a result, a rear portion of the outer side wall 16A protrudes toward the vehicle exterior side beyond the front portion of the outer side wall 16A.

A shield joining surface 30, which is a joining surface of the windshield 24, and a transparent component joining surface 32, which is a joining surface of the pillar glass 20, are included as part of the outer peripheral surface of the first frame component 16. Specifically, a portion of the surface at the vehicle exterior side of the first frame component 16, namely, of the surface at the vehicle exterior side of the outer side wall 16A that is further to the vehicle front side (i.e., further to the inner side in the vehicle width direction) than the step-shaped portion 16A1 forms the shield joining surface 30, while a portion thereof that is further to the vehicle rear side (i.e., further to the outer side in the vehicle width direction) than the step-shaped portion 16A1 forms the transparent component joining surface 32. The shield joining surface 30 and the transparent component joining surface 32 are each formed in a planar shape. Moreover, as a result of the step-shaped portion 16A1 being formed at the outer side wall 16A, the shield joining surface 30 is set back at the vehicle interior side from the transparent component joining surface 32. Note that it is not strictly necessary that the shield joining surface 30 and the transparent component joining surface 32 be formed in a planar shape, and they may also be formed having a slight curve.

The second frame component 18 has an outer side wall 18A that is disposed at a vehicle exterior side, a front side wall 18B that extends from a front end portion of the outer side wall 18A towards an inner side and towards the vehicle rear side, an inner side wall 18C that extends from an end portion at the inner side of the front side wall 18B towards the vehicle rear side and towards an outer side, and a rear side wall 18D that extends from a rear end portion of the inner side wall 18C towards the outer side and towards the vehicle front side. An end portion at the outer side in the vehicle width direction of the rear side wall 18D is connected to a rear end portion of the outer side wall 18A. A cross-section of the rear side wall 18D when viewed in the longitudinal direction of the second frame component 18 is bent substantially in a W shape, and a central portion thereof is formed as a step-shaped portion 18D1.

An end portion at the inner side of the rear side wall 18D is bent towards the vehicle rear side so as to extend alongside the inner side wall 18C, and is superimposed from the outer side onto a rear portion of the inner side wall 18C. As a result, a protruding portion 36 that extends in a flange shape towards the vehicle rear side is formed. An opening weather strip 40 that is made of rubber and provides a seal between a front side door 38 and the A pillar 14 is attached to the protruding portion 36. This protruding portion 36 is disposed in an area that overlaps with a front end portion of the front side door 38 when viewed from the vehicle interior side, in other words, in an area that was originally a blind spot for a vehicle occupant who is looking outside the vehicle.

A transparent component joining surface 42, which is a joining surface of the pillar glass 20, is included as part of the outer peripheral surface of the second frame component 18. Specifically, a surface at the vehicle exterior side of the second frame component 18, namely, a surface at the vehicle exterior side of the outer side wall 18A forms the transparent component joining surface 42. This transparent component joining surface 42 is formed in a planar shape. Note that it is not strictly necessary that the transparent component joining surface 42 be formed in a planar shape, and it may also be formed having a slight curve.

The pillar glass 20 is formed, for example, from inorganic glass or from high-strength transparent resin, and is formed in the shape of a transparent plate. Note that examples of a high-strength transparent resin include polycarbonate strengthened with glass fibers (PC-GF), and polycarbonate strengthened with cellulose nanofibers (PC-CNF), and the like. This pillar glass 20 bridges the gap between the first frame component 16 and the second frame component 18.

Specifically, the pillar glass 20 is joined to a vehicle exterior side of the first frame component 16 and the second frame component 18, and forms a design surface at the vehicle exterior side of the A pillar 14. This pillar glass 20 is disposed such that a plate thickness direction thereof extends in an orthogonal direction relative to the longitudinal direction of the A pillar 14. A front end portion of the pillar glass 20 is disposed at a vehicle exterior side relative to the transparent component joining surface 32 of the first frame component 16, and is joined (i.e., bonded) to the transparent component joining surface 32 via an adhesive agent 44 such as a urethane sealant. Cushion rubber (not shown in the drawings) is provided at a vehicle rear side of the adhesive agent 44, and a gap between the transparent component joining surface 32 (i.e., the outer side wall 16A) and the front end portion of the pillar glass 20 is closed off by this cushion rubber.

A rear end portion of the pillar glass 20 is disposed at a vehicle exterior side relative to the transparent component joining surface 42 of the second frame component 18, and is joined (i.e., bonded) to the transparent component joining surface 42 via an adhesive agent 46 such as a urethane sealant. Cushion rubbers (not shown in the drawings) are provided on both sides in the vehicle front-rear direction of the adhesive agent 46, and gaps between the transparent component joining surface 42 (i.e., the outer side wall 18A) and the rear end portion of the pillar glass 20 are closed off by these respective cushion rubbers.

An end portion (i.e., a right end portion) in the vehicle width direction of the windshield 24 is disposed at a vehicle front side and an inner side in the vehicle width direction of the pillar glass 20. The end portion in the vehicle width direction of the windshield 24 is disposed at a vehicle exterior side relative to the shield joining surface 30 of the first frame component 16, and is joined (i.e., bonded) to the shield joining surface 30 via an adhesive agent 48 such as a urethane sealant or the like. A gap between the end portion in the vehicle width direction of the windshield 24 and the front end portion of the pillar glass 20 is closed off by a rubber windshield molding 50 that is fitted onto an outer peripheral portion of the windshield 24.

The pillar garnish 22 shown in FIG. 1 is formed, for example, from resin, and forms a design surface at the vehicle interior side of the A pillar 14. This pillar garnish 22 has a first pillar garnish portion 22A that covers the first frame component 16 from the vehicle interior side, and a second pillar garnish portion 22B that covers the second frame component 18 from the vehicle interior side. An aperture 23 is formed between the first pillar garnish portion 22A and the second pillar garnish portion 22B. This aperture 23 extends in the longitudinal direction of the A pillar 14. The pillar glass 20 is visible on the vehicle interior side via this aperture 23.

In the A pillar 14 having the above-described structure, the transparent pillar glass 20 bridges the gap between the first frame component 16 and the second frame component 18. As a result, a vehicle occupant sitting in the driver's seat (not shown in the drawings) and a vehicle occupant P sitting in a front passenger's seat PS of the vehicle 12 are able to view the vehicle exterior through the gap 26 between the first frame component 16 and the second frame component 18.

Actions and Effects

Next, actions and effects of the present exemplary embodiment will be described.

In the vehicle pillar structure 10 having the above-described structure, the transparent pillar glass 20 bridges the gap between the first frame component 16 and the second frame component 18 that extend in the longitudinal direction of the A pillar 14 of the vehicle 12. The first frame component 16 and the second frame component 18 are formed in a cylindrical shape having no seams in a cross-section thereof, and the pillar glass 20 is joined to the planar transparent component joining surfaces 32 and 42 which are included as part of the outer peripheral surfaces of the respective frame components 16 and 18. Because of this, the flanges that are used when a frame component is formed by welding together two plate materials, and the flanges that are used for joining to the pillar glass 20 are no longer necessary. Consequently, the width of the respective frame components 16 and 18 can be made narrower. As a result, the visibility of a vehicle occupant for the outside of the vehicle is improved.

Moreover, in the present exemplary embodiment, the planar transparent component joining surface 32, to which the pillar glass 20 is joined, and the planar shield joining surface 30, to which the windshield 24 is joined, are included as part of the outer peripheral surface of the first frame component 16. As a consequence, because it is no longer necessary to provide flanges at the first frame component 16 in order to join the windshield 24 thereto, the width of the first frame component 16 to which the windshield 24 is joined can be made narrower.

Furthermore, in the first frame component 16, the step-shaped portion 16A1 is formed between the windshield 24 and the pillar glass 20, and the shield joining surface 30 is set back further toward the vehicle interior side than the transparent component joining surface 32. As a consequence, for example, windshield washing liquid blown onto the windshield 24 is able to flow upwards (i.e., towards the roof side of the vehicle 12) easily along the step-shaped portion 16A1, and is impeded from flowing towards the pillar glass 20 side. Accordingly, windshield washing liquid can either be prevented, or effectively impeded from sticking to the pillar glass 20.

Figure 3:
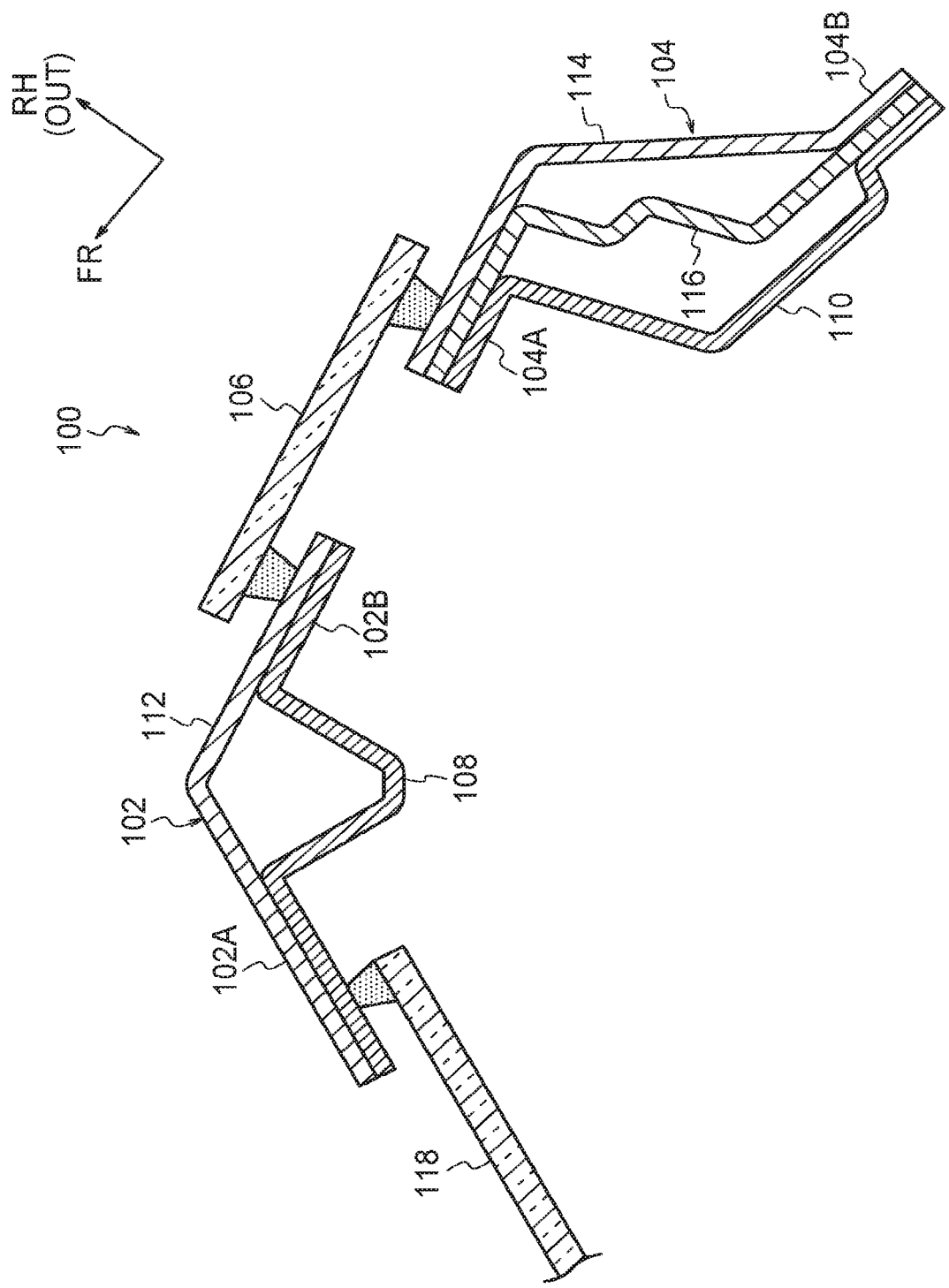
FIG. 3 is a cross-sectional view corresponding to FIG. 2 showing a comparative example.

A supplementary explanation of the above-described effects will now be given using a conventional A pillar 100 (hereinafter, referred to as a 'comparative example 100') shown in FIG. 3. In this comparative example 100, in the same way as in the present exemplary embodiment, a structure is employed in which pillar glass 106 bridges a gap between a first frame component 102 and a second frame component 104. However, the first frame component 102 and the second frame component 104 each form closed cross-sections as a result of two steel plates, namely, inner panels 108 and 110 and outer panels 112 and 114 being spot-welded together respectively. Note that in the second frame component 104, reinforcement 116, which is a separate steel plate, is disposed between the inner panel 110 and the outer panel 114.

In the comparative example 100, a structure is employed in which the first frame component 102 and the second frame component 104 are respectively spot-welded together via welding flanges 102A, and 102B, or 104A and 104B, and the windshield 118 and the pillar glass 106 are joined to the flanges 102A, 102B, and 104A. Because of this, the widths of the respective frame components 102 and 104 are enlarged by the size of the flanges 102A, 102B, 104A, and 104B. Moreover, because this comparative example 100 has a structure in which multiple steel plates (i.e., plate materials) are joined together, there is an increase in the number of parts.

In contrast to this, because the first frame component 16 and the second frame component 18 of the present exemplary embodiment are formed by non-circular pipes manufactured via a 3-Dimensional Hot Bending and Direct Quench process, the width (i.e., the cross-section) thereof can be made narrower while sufficient strength is secured. Moreover, compared with when two plate materials are welded together, it is possible to reduce both the number of parts and the number of component mounting steps. Additionally, as in the case of the first frame component 16, it is also possible to secure the joining surfaces 32 and 42 of the windshield 24 and the pillar glass 20. Furthermore, because no seams (i.e., weld portions) are formed in the cross-sections of the respective frame components 16 and 18, rigidity against twisting of the respective frame components 16 and 18 is improved.

Supplementary Description of the Exemplary Embodiment

In the above-described exemplary embodiment, a structure is employed in which the first frame component 16 and the second frame component 18 are formed via a 3-Dimensional Hot Bending and Direct Quench process, however, the present disclosure is not limited to this. For example, it is also possible to employ a structure in which the pair of frame components are manufactured via a hot extrusion process or the like. Additionally, the material used for the pair of frame components is not limited to high-tensile steel plate, and it is also possible to use a light metal such as, for example, aluminum.

Moreover, in the above-described exemplary embodiment, a structure is employed in which the first frame component 16 and the second frame component 18 are formed in a substantially rectangular shape, however, the present disclosure is not limited to this. It is sufficient if the frame components include, as part of their outer peripheral surfaces, planar transparent component joining surfaces to which a transparent component can be joined, and the cross-sectional configuration of the frame components can be altered as is appropriate.

Moreover, in the above-described exemplary embodiment, a case is described in which the vehicle pillar structure according to the present disclosure is applied to the A pillar 14 of the vehicle 12, however, the present disclosure is not limited to this, and the vehicle pillar structure according to the present disclosure can also be applied to a C pillar or the like of a vehicle. In a vehicle in which substantially triangular fixing glass (FIX glass) is provided between the A pillar and the front side door, it is also possible for a planar joining surface to which this fixing glass is joined to be set on an outer peripheral portion of the second frame component.

Furthermore, various modifications and the like may be made to the present disclosure insofar as they do not depart from the scope of the present disclosure. Additionally, the scope of the present disclosure is not limited to the above-described exemplary embodiment.

What is claimed is:

1. A vehicle pillar structure comprising:
    a pair of frame components extending in a longitudinal direction of a vehicle pillar; and
    a transparent component bridging a gap between the pair of frame components,
    wherein each frame component of the pair of frame components is in a cylindrical shape having no seams in a cross-section thereof, and
    wherein an outer peripheral surface of each frame component of the pair of frame components includes a planar joining surface to which the transparent component is joined, and
    wherein the planar joining surface of each pair of frame components is entirely planar.

2. The vehicle pillar structure according to claim 1, wherein the outer peripheral surface of one frame component of the pair of frame components includes a planar shield joining surface to which a windshield is joined.

3. A vehicle pillar structure comprising:
    a pair of frame components extending in a longitudinal direction of a vehicle pillar; and
    a transparent component bridging a gap between the pair of frame components,
    wherein each frame component of the pair of frame components is in a cylindrical shape having no seams in a cross-section thereof,
    wherein an outer peripheral surface of each frame component of the pair of frame components includes a planar joining surface to which the transparent component is joined,
    wherein the outer peripheral surface of one frame component of the pair of frame components includes a planar shield joining surface to which a windshield is joined, and
    wherein the outer peripheral surface of the one frame component includes a step-shaped portion formed between the shield joining surface and the transparent component joining surface, such that the shield joining surface is set back further toward a vehicle interior side than the transparent component joining surface.

4. The vehicle pillar structure according to claim 2, wherein the outer peripheral surface of the one frame component includes a step-shaped portion formed between the shield joining surface and the transparent component joining surface, such that the shield joining surface is set back further toward a vehicle irate side than transparent component joining surface.

5. The vehicle pillar structure according to claim 1, wherein one of the pair of frame components further includes
    an outer side wall disposed at an exterior side of the vehicle;
    a front side wall that extends substantially perpendicular to the outer side wall;
    an inner side wall disposed at an interior side of the vehicle; and
    a rear side wall extending substantially perpendicular to the front side wall.

6. The vehicle pillar structure according to claim 1, wherein the outer peripheral surface of one of the pair of frame components includes a step-shaped portion.

7. The vehicle pillar structure according to claim 1, wherein the outer peripheral surface of one of the pair of frame components includes a shield joining surface to which a windshield is joined, the shield joining surface being disposed closer to an inner side wall of the respective frame component than the planar joining surface.

8. The vehicle pillar structure according to claim 7, wherein the inner side wall of the respective frame component is disposed at an interior of the vehicle and is substantially parallel to the planar joining surface.

* * * * *